DIRECT COUPLED AM DETECTOR

Filed March 3, 1969 3 Sheets-Sheet 1

INVENTOR
JACK R. HARFORD
BY Eugene M. Whitacre
ATTORNEY

Feb. 2, 1971 J. R. HARFORD 3,560,865

DIRECT COUPLED AM DETECTOR

Filed March 3, 1969 3 Sheets-Sheet 2

INVENTOR
JACK R. HARFORD

BY Eugene M. Whitacre

ATTORNEY

INVENTOR
JACK R. HARFORD
BY Eugene M. Whitacre
ATTORNEY

United States Patent Office 3,560,865

Patented Feb. 2, 1971

3,560,865
DIRECT COUPLED AM DETECTOR

Jack R. Harford, Three Bridges, N.J., assignor to RCA Corporation, a corporation of Delaware Filed Mar. 3, 1969, Ser. No. 803,920
Int. Cl. H03d 1/18; H04b 1/16; H04n 5/44
U.S. Cl. 329—101 12 Claims

ABSTRACT OF THE DISCLOSURE

An amplitude modulation detector circuit employs a rectifier coupled to a source of signal modulated carrier waves containing a direct voltage component not related to the modulation components of the carrier wave. The direct voltage component is monitored by a circuit, which also includes a rectifier, to derive a voltage for maintaining a stable low current bias through the detector amplifier. The rectifier in the monitoring circuit is returned to a point of reference potential by a transistor whose impedance is controlled as an inverse function of the detected signal.

This invention relates to signal modulation detector circuitry, and more particularly to integrated circuit configurations for providing detection of the amplitude modulation components of relatively high frequency intermediate frequency waves. Circuitry embodying the invention is particularly suitable for use as the video detector of television receivers.

In present day technology, integrated circuits are receiving increasing attention. Although there is published material concerning the use of integrated circuit devices in signal receivers such as television receivers, the actual use of such devices has been limited. In most cases, prior proposals for the circuitry to be integrated either involve the use of general purpose integrated circuit devices, or use lumped circuit design philosophy, both of which require a large number of components; which cannot be satisfactorily incorporated in integrated circuit form, and hence must be provided externally of the chip. It is desirable to limit the number of external components for reasons of circuit economy and because of the packaging limitations in the number of externally available terminals which can be conveniently and economically provided on an integrated circuit chip.

In the design of amplitude modulation detectors, such as video detectors for television receivers, it is desirable to provide direct coupling between the detector and a preceding intermediate frequency amplifier which may be located on the same integrated circuit chip. The reason for the direct coupling is to avoid the necessity for external connections between the two stages and the use of a coupling capacitor or transformer which are not susceptible of economical fabrication using integrated circuit techniques. The direct coupling of an intermediate frequency amplifier to the detector presents a problem in that the detector is subjected to an undesirable direct current component which can adversely affect the detector performance. A further drawback is that the direct current component is translated through the detector to a succeeding low frequency amplifier which is desirably direct current coupled thereto, thereby limiting the signal excursion range over which the detected signal may drive the amplifier. Apart from the direct coupling of the detector to the preceding intermediate frequency amplifier, it is often desirable to provide a biasing current for the amplifier to improve the detected linearity. Such biasing current constitutes a direct current component in the detected signal which is not due to the signal.

It is therefore an object of the present invention to provide an improved detector configuration capable of linear, repeatable operation while providing detected video signals independent of undesired D.C. components applied thereto.

In a detector embodying the invention, a circuit including a first rectifying junction is connected between a source of signal modulated carrier waves including an undesired direct current component and a utilization circuit for deriving the modulation components from the carrier wave. Another circuit responsive substantially only to the undesired direct current component and including the series connection of a second rectifying junction and a dynamic impedance element is connected across the source of carrier waves. An impedance element couples the terminals of the two rectifying junctions remote from the source of carrier waves to stabilize the bias current through the first rectifying junction. A feedback circuit is provided from the utilization means to the dynamic impedance element for varying the impedance thereof as an inverse function of detected signal amplitude.

These and other objects of the present invention will become clearer as reference is made to the following specification and figures in which.

Figure 1:
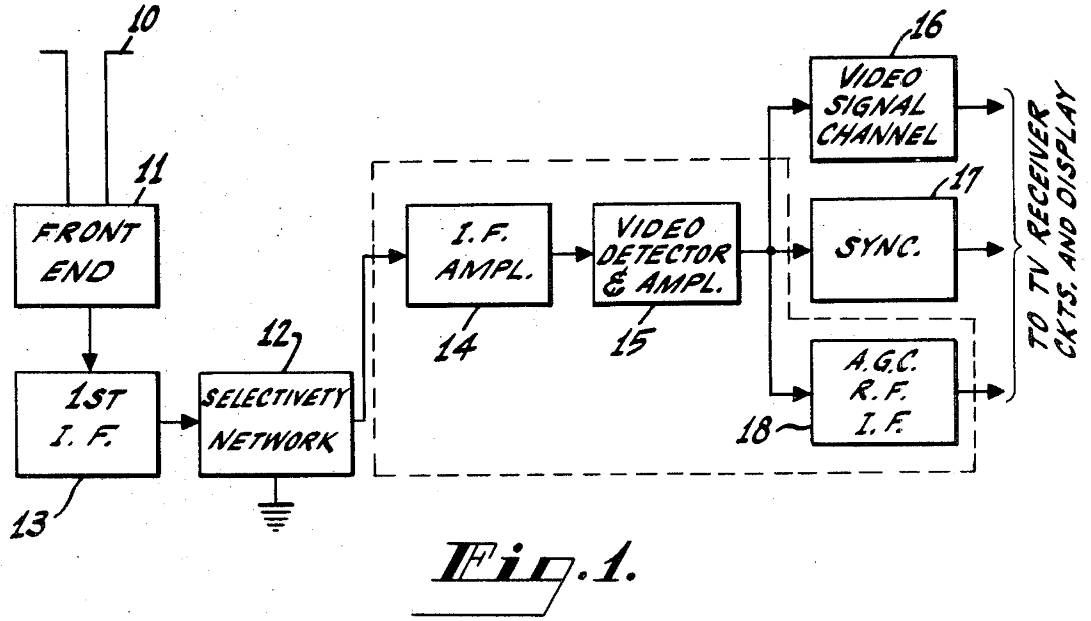
FIG. 1 is a schematic diagram in block form of a portion of a television receiver.

FIG. 1 shows a schematic circuit diagram, in block form, of a portion of a television receiver. Signals intercepted by an antenna 10 are applied to a tuner 11 which includes the radio frequency (RF) amplifier, mixer and local oscillator, necessary for selecting one of a plurality of television channels. Circuits, not shown, tuned to the intermediate frequency (IF) select and apply the resulting IF signals to a first IF amplifier 13. Additional selectivity is provided by a filter 12 connected between a first IF amplifying stage 13 and a second IF amplifying stage 14. The IF amplifying stage 14 is, as will be further described, a direct coupled wideband amplifier, included on an integrated circuit substrate.

The IF amplifier 14 is coupled to a video detector and amplifying circuit 15. The output signal from the video detector and amplifier 15 is utilized in a television receiver to drive the video signal amplifier 16, synchronizing circuitry 17 and AGC circuitry 18.

The stages described above are included in most conventional television receivers. The portion of the circuit included in the dashed rectangle 19 are included on a single integrated circuit chip. Such an integrated circuit device, constructed in accordance with known techniques, is described in a copending application entitled "Amplifier Circuits" by Jack Avins, Ser. No. 803,544 filed Mar. 3, 1969.

As stated above, in the integrated circuit environment it is desirable to have a video detector 15, which requires no external connections to or from the integrated chip while exhibiting substantially linear detection of the video signals at the relatively low signal levels.

The ability of the detector to work linearly at low levels indicates that the IF signal, applied thereto to be detected, may be of relatively low voltage levels and power levels, as compared to the magnitude of such signals found in receivers, using present design philosophy.

Secondly, the complete inclusion of the video detector within or on the integrated circuit assembly eliminates the input connection thereto which would normally require at least one pin or connector terminal for interfacing with the external environment.

Thirdly, this location of the video detector on the integraded circuit assembly avoids the necessity of bringing the high level amplified high frequency IF signal to an output terminal for interfacing with external circuitry.

Figure 2:
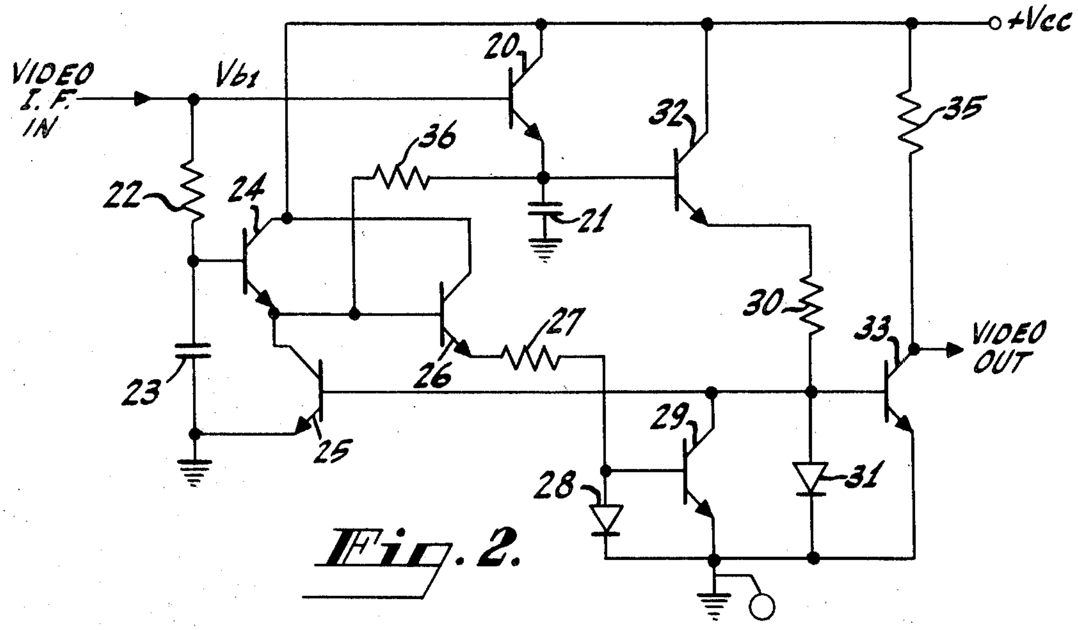
FIG. 2 is a schematic circuit diagram of a video detector according to this invention.

FIG. 2 shows a transistor 20 arranged in an emitter follower configuration to be utilized as a video detector. Transistor 20 has a collector electrode returned to a point of reference potential designated as $+V_{cc}$. The base electrode of transistor 20 is coupled to a source of video intermediate frequency IF signals, which also includes an undesirable D.C. component because of a direct coupling to the IF amplifier 14 shown in FIG. 1. The emitter electrode of transistor 20 is coupled to a point of reference potential, such as ground, through a filtering or detector capacitor 21. Also coupled to the base electrode of transistor 20 is a series combination of a resistor 22 and capacitor 23 coupled between said base electrode and a point of reference potential.

The junction between resistor 22 and capacitor 23 is coupled to the base electrode of a bias reference transistor 24. Transistor 24 is arranged in an emitter follower configuration having the collector electrode coupled to $+V_{cc}$ and the emitter electrode returned to ground through the collector to emitter path of a dynamic impedance element represented by modulated bias transistor 25. The emitter electrode of transistor 24 is coupled to the base electrode of transistor 26 functioning as part of a D.C. bias circuit. A resistor 36, for discharging the capacitor 21 is coupled between the emitter electrodes of transistors 20 and 24. Transistor 26 is also connected in an emitter follower configuration having the collector electrode returned to $+V_{cc}$. The emitter electrode of transistor 26 is referenced to ground through the series combination of a resistor 27 and the anode to cathode path of diode 28.

Diodes as 28, as utilized in the integrated circuit environment, are preferably collector to base shorted transistors. Such devices provide impedance matching and temperature stabilization for the transistors with which they are used.

The junction between resistor 27 and the anode of diode 28 is coupled to the base electrode of a transistor 29. Transistor 29 has its emitter electrode coupled to a point of reference potential and its collector electrode coupled to the junction of a resistor 30 and the anode of a diode 31. The cathode of diode 31 is returned to the point of reference potential, while the opposite terminal of resistor 30 is coupled to the emitter electrode of a transistor 32, arranged in an emitter follower configuration, and having its base electrode directly coupled to the emitter electrode of a video detector transistor 20. The collector electrode of transistor 29, and therefore the junction between resistor 30 and the anode of diode 31 is connected to the base electrode of a video output transistor 33, having its emitter electrode coupled to ground and its collector electrode coupled to $+V_{cc}$ through a load resistor 35.

All of the above described circuit elements are incorported on a single integrated circuit chip. The several emitter follower transistor configurations lend themselves to integrated circuit environments in that the area required on an integrated circuit substrate for the deposition of an emitter follower circuit is approximately five times less than that area required for the deposition of an alternate configuration such as a common collector or common base amplifier. Therefore utilization of the emitter follower to perform circuit functions results in enabling more circuit functions on a given size substrate.

In order to assure optimum detector linearity for relatively small video input signals, as applied to the base electrode of the video detector transistor 20, very small biasing currents must be utilized. Such small biasing currents may be of the order of magnitude of 5 to 50 micro-amperes. A detector circuit so biased, with the configuration shown, is capable of providing a detected output which will be linear for signals two times smaller than those capable of being detected by a conventional unbiased point contact diode detector.

Linear small signal operation of this detector is associated with low current bias plus a low impedance drive. Linear large signal operation is associated with the high input impedance of the emitter follower detector. The low impedance drive assures that the detector capacitor 21 will be charged to the peak value of low amplitude signals.

The low bias required for transistor 20 is associated with still another separate, although related consideration. Because the IF amplifier is D.C. coupled to the detector, the input signal to be detected by video detector transistor 20 also contains an undesired D.C. component which is some fraction of the supply potential $+V_{cc}$. Therefore the video detector transistor 20 must be stably biased for linear operation at relatively low current levels while being subjected to a D.C. component applied to its base electrode and derived from the IF output amplifier stage. In order to accomplish low current biasing of transistor 20, transistor 24 is employed to sense the D.C. voltage at the base of transistor 20 via resistor 22.

Resistor 22 in combination with capacitor 23 also provides filtering action at the base electrode of transistor 24 of a sufficient magnitude to remove the signal components from influencing the D.C. potential on the base electrode of transistor 24. To assure low emitter current in the transistor 20 and D.C. tracking, the voltage drop across resistor 22 must be small; and the voltage drop across the base to emitter junction of transistor 24 must closely match the voltage drop across the base to emitter junction ($V_{be}$) of transistor 20. The above conditions as determined by the low bias currents in transistor 20, specify, in turn, that very low currents must flow through transistor 24. However, when a large signal is detected by transistor 20 a large voltage is developed across capacitor 21. This voltage is of a polarity in a direction tending to cutoff or reverse bias transistor 24 via resistor 36.

Accordingly, during a large signal condition the large current induced through resistor 36 would tend to reverse bias transistor 24 if the transistor 25 were not present. Transistor 25 derives a modulated base signal from the collector electrode of transistor 29, forming part of the biasing scheme as follows.

The D.C. voltage at the base electrodes of transistors 20 and 24 are relatively equal and can be generally designated as $V_{bl}$. The voltage at the emitter electrode of transistor 20, is therefore $V_{bl}-V_{be}$, where $V_{be}$ is the voltage drop across the base to emitter junction of transistor 20. Accordingly the voltage at the emitter electrode of transistor 32 would be $V_{bl}-2V_{be}$ assuming equal base to emitter voltage drops for transistors 20 and 32. In the same manner the voltage at the emitter electrode of transistor 26 is also approximately equal to $V_{bl}-2V_{be}$, further assuming that there is no significant D.C. drop across resistor 22, which assumption is valid as only small magnitude base current flows therethrough. However, there is actually a small potential difference between these stages of the order of magnitude of .01 to .05 volt, the lower potential being at the emitter electrode of transistor 24. This low potential difference specifies the biasing current for transistor 20 as that flowing through resistor 36.

If resistor 27 located in the emitter path of transistor 26, and resistor 30 located in the emitter path of transistor 32, are made approximately equal then the current flowing from the emitter of transistor 32 approximately equals the current flowing from the emitter of transistor 26. It can be seen that by biasing transistor 29, with reference to the voltage drop across diode 28 and the current flowing through resistor 27, transistor 29 will require as much collector current as is flowing through resistor 30. Therefore there can be no substantial current flow in diode 31, trânsistor 33 or transistor 25.

What is meant by no substantial current flow in the above description, is that the current flow through the devices is substantially small when compared to the total current flowing through resistor 30. Accordingly, the voltage across diode 31 is essentially the small current anode to cathode drop which is on the order of about .5 to .6 volt. The voltage at the collector of transistor 33 in this condition is approximately at $+V_{cc}$, due to the small base current.

As soon as signal is present, a voltage is detected across capacitor 21 due to the peak detection action of the capacitor 21 in conjunction with the base to emitter diode of transistor 20. The detected D.C. potential is applied to the base electrode of transistor 32 which increases its conduction and hence increases the amount of current flowing through resistor 30. The potential at the anode of diode 31 goes from the small current anode to cathode voltage to the large current anode to cathode voltage, which levels differ by approximately one tenth of a volt. However, due to the relatively low dynamic impedance of diode 31, compared to the relatively higher dynamic impedance, seen looking into the base of transistor 33, a smaller portion of the signal current flows through the base to emitter junction of transistor 33 causing the collector electrode potential of transistor 33 to decrease from $+V_{cc}$ towards ground. Depending upon the amount of signal current coupled to transistor 33 the collector voltage can exhibit a swing practically equivalent to the full $+V_{cc}$ supply. In this manner, irrespective, of the D.C. component existing at the base electrode of transistor 20, the collector electrode of transistor 33 can exhibit large voltage swings below $V_{cc}$ towards ground. This operation is obtained for small IF signal levels superimposed on that D.C. component and applied to the base electrode, and of detector 20 as further coupled through the complete D.C. coupled amplifier configuration, described.

As indicated above, the base to emitter diode of transistor 25 is also coupled to the collector electrode of transistor 29, and receives a portion of the increased current through diode 31 due to signal conditions. This, then, causes transistor 25 to conduct in accordance with the magnitude of the detected signal amplitude. The conduction of transistor 25 assures that transistor 24 will not become back biased due to large signal levels which condition would otherwise upset the prearranged biasing levels. The detector circuit of FIG. 2 is inherently temperature stable as the voltage drops across the base to emitter junctions of the transistors and those across the collector to base shorted diodes, in the schematic shown, serve to track with temperature. In summation the circuit described in FIG. 2 provides linear detection of low level video signals, irrespective of a D.C. component applied with said signals; by functioning to effectively cancel the D.C. component from the output amplifying stage. Such cancellation is provided while maintaining a high gain to the detected video signals with voltage swings comparable to the magnitude of the D.C. operating supply.

Figure 3:
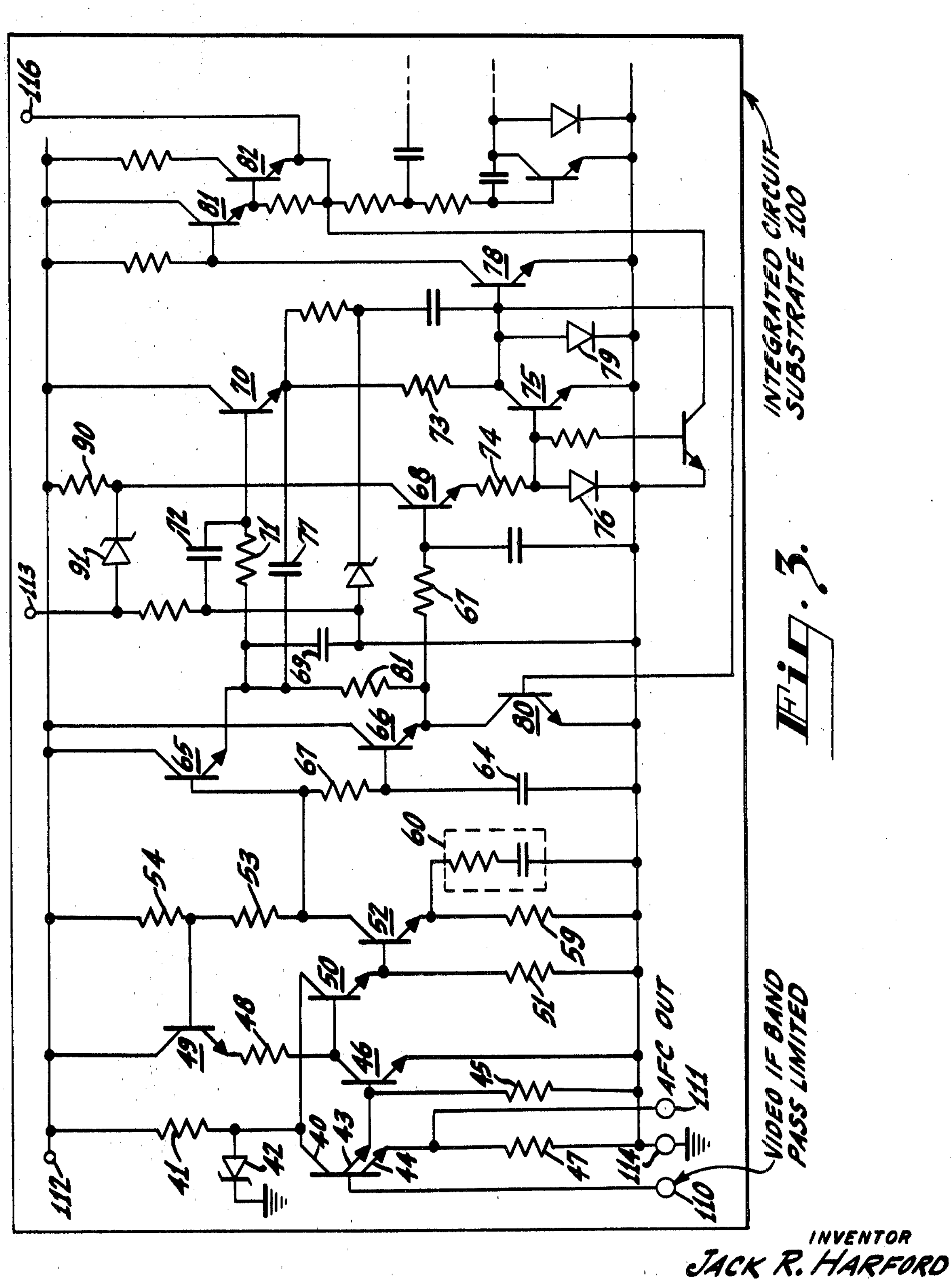
FIG. 3 is a schematic circuit diagram of an integrated circuit configuration employing a detector according to this invention.

FIGURE 3 shows a schematic circuit diagram showing those circuit elements incorporated in the integrated circuit device within the dashed rectangle.

An input terminal 110 is coupled to the base electrode of a double emitter transistor 40, having the collector electrode returned to terminal 112, through a series resistor 41. An integrated Zener diode 42 is connected between the collector electrode and ground and functions to provide decoupling and impulse noise current limiting. One emitter electrode of transistor 40 is coupled to the base electrode of transistor 46, arranged in a common emitter configuration, and returned to terminal 114 through resistor 45. A second emitter electrode of transistor 40 is returned to terminal 114, through resistor 47, and is coupled to terminal 111, designated as AFC (automatic frequency control).

Common emitter stage transistor 46 has the collector electrode returned to terminal 112 through a load resistor 48 in series with the emitter to collector path of a transistor 49.

The collector electrode of transistor 46 is also coupled to the base electrode of a follower configuration employing transistor 50. The output emitter electrode of transistor 50 is returned to terminal 114 through a resistor 51 and is coupled to the base electrode of transistor 52. Transistor 52 has a split collector load comprising series resistors 53 and 54, the junction therebetween being connected to the base electrode of transistor 49. The emitter electrode of transistor 52 is returned to ground through a self biasing and degenerative feedback resistor 59, which is bypassed for high frequency by the series R–C network 60 enclosed within dashed lined rectangle.

The series R–C network 60 is provided by integrated circuit techniques by depositing a lossy capacitor on the integrated circuit substrate. The component within rectangle 60 represent the circuit equivalent of the lossy capacitor and frequency compensation is thereby provided by selecting the component to furnish approximately ten degrees of phase shift at the higher IF frequencies.

The above described circuit includes a two stage wideband IF amplifier utilizing negative feedback with direct coupling between stages. In operation, a source of potential is connected between terminals 112 and 114, with the more positive terminal of the source connected to terminal 112. Such a source may conveniently be regulated by suitable circuitry included on the integrated circuit substrate assembly, such as that described in the aforementioned copending application.

The double emitter follower stage affords to isolate a selective filtering network, having a terminal coupled to terminal 110. This permits the filter to operate relatively unloaded so as not to adversely affect the desired bandpass. To assure further isolation the emitter follower including the emitter electrode 44 isolates the same selective network as operated with low IF signals from the automatic frequency control circuitry included in certain television receivers. The follower circuit including emitter electrode 43 drives the common emitter amplifier 46 which provides voltage gain for the low level IF signals in accordance with the impedance of the controllable collector load comprising resistor 48 in series with the collector to emitter path of transistor 49. The amplified IF signal is applied to the base of an emitter follower 50 which drives the common collector amplifier 52. A portion of the output of amplifier 52, i.e. that voltage appearing between the junction of resistors 53 and 54, is feedback to the base electrode of transistor 49 to maintain the gain of the above mentioned IF stage relatively constant. The negative feedback afforded by transistor 49 as controlled by the collector swing of transistor 52 serves to stabilize the IF amplifier operating performance and maintain the signal gain relatively constant within the IF frequncy range. The negative feedback is important as the common emitter stage 52 is direct coupled to the base electrode of the video detector follower 65. The emitter follower 65 has a high input impedance which is subjected to relatively large variations according to the input signal applied. Therefore the video detector 65 reflects back a non-linear load to the collector electrode of the IF amplifier stage 52. This effect is compensated for by the negative feedback arrangement just described to maintain the IF gain constant in spite of the varying loading conditions. The output emitter electrode of follower transistor 65 operating as a video detector, has a capacitor 69 connected between the emitter electrode and terminal 114 or reference potential.

The viedo detector circuitry, to be described, is similar to that circuitry already described in FIG. 2 but some actual integrated circuit problems will be described in greater detail. As indicated above an undesired direct voltage from the collector electrode of transistor 52 is applied to the base electrode of transistor 65 along with the IF signal when present. In order for transistor 65 to provide linear detection for low level signals it is desirable to stably bias the follower stage at low current levels for the base to emitter diode of transistor 65. Accordingly the direct voltage coupled from the collector electrode of transistor 52 is also applied to the base electrode of transistor 66 via a resistor 67. Resistor 67 in conjunction with capacitor 64, coupled from the base electrode of transistor 66 to ground, serves to bypass the IF video frequencies from the bas electrode of transistor 66 to ground to thereby maintain the voltage at the base representative only of that D.C. component applied to the base electrode of transistor 65. Resistor 67 is selected of a magnitude so that there is no substantial voltage drop across the same, while being large enough so as not to load the IF amplifier 52. Therefore, the voltage at the emitter electrodes of transistors 65 and 66 are approximately equal. The emitter electrode of transistor 66 is coupled through resistor 67 to the base electrode of an emitter follower configuration including transistor 68 which corresponds to transistor 26 of FIG. 2. In a similar manner the emitter electrode of transistor 65 is coupled to the base electrode of the follower transistor 70 through resistor 71. Resistor 71 serves with capacitor 72 as a selective filter for bypassing the 45 mHz. signal, corresponding to the video IF carrier, from the base electrode of transistor 70. A capacitor 77 is coupled between the emitter electrodes of transistors 65 and 70. Capacitor 77 serves to bootstrap the signal when the R-C network of resistor 71 and capacitor 72, begins to roll-off; to maintain the follower action of transistor 70 at high frequencies. Transistor 70 performs similar to transistor 32 of FIG. 2. Considering the various $V_{be}$ drops, if resistor 73 in series with the emitter electrode of transistor 70, and resistor 74 in series with the emitter electrode of transistor 68 are made approximately equal, the current flowing through each resistor is approximately equal.

Transistor 75 is biased by means of a diode 76 which actually comprises a transistor with the collector connected to the base. The diode 76 is coupled between the base electrode of transistor 75 and ground so that transistor 75 emitter to collector current equals the current flowing through resistor 73. The collector electrode of transistor 75 is coupled to the base electrode of transistor 78 which functions in a manner similar to that of transistor 33 of FIG. 2. Base voltage for transistor 78 which, in the absence of A.C. signal, operates close to cutoff, is developed across diode 79 coupled between the base electrode and the point of reference potential.

As described previously, the detected video signal charges capacitor 69, increasing the current flowing through resistor 73. Most of the increment of the current due to the detected video signal is returned to ground through diode 79 in parallel with the base electrode of transistor 78. Transistor 78 receives a corresponding amount of base current in relation to its dynamic impedance when compared to that dynamic impedance of the diode 79. This current transfer across the constant $V_{be}$ drop of the diode, swings the collector of transistor 78 from B+ towards ground only upon the detection of the video signal. The output signal at the collector electrode of transistor 78 is therefore independent of the undesired D.C. component applied to the base electrode of transistor 65, even though the entire amplifier chain is D.C. coupled to maintain the detected D.C. component of the video signal. Transistor 80 and resistor 81 perform the equivalent functions as their counterparts transistor 25 and resistor 36, shown in FIG. 2.

The large collector swing obtainable from the collector electrode of transistor 78 is isolated from an output terminal 116 on the integrated circuit substrate 100 by the pair of emitter follower circuits including transistors 81 and 82. The video signal swing at output terminal 116 is $2V_{be}$ less than the signal swing at the collector electrode of transistor 78. The video signal available at terminal 116 is suitable for driving the sync and high level video amplifier stages which may be included within the television receiver. The magnitude of video swing available at terminal 116 is still a considerable portion of the $V_{cc}$ supply as applied between terminals 112 and 114.

In order to further assure operating point stabilization with temperature changes, and to maintain large signal linearity, a D.C. loop is closed from the video detector circuitry back to the input terminal 110 associated with the IF amplifiers.

The D.C. feedback, is obtained via resistor 90, in series with the collector electrode of transistor 68 and terminal 112, and the Zener diode 91, coupled between the collector electrode of transistor 68 and terminal 113.

A voltage appears across resistor 90 which is dependent upon the current flowing through transistor 68 and therefore through resistor 74. This current, as previously explained, is the bias reference current for the video detector output stages. The voltage is reduced in level by Zener diode 91 action, which affords temperature compensation as well, and is eventually, as will be described with reference to FIG. 4, applied to terminal 110 for controlling the quiescent bias of transistor 40.

Figure 4:
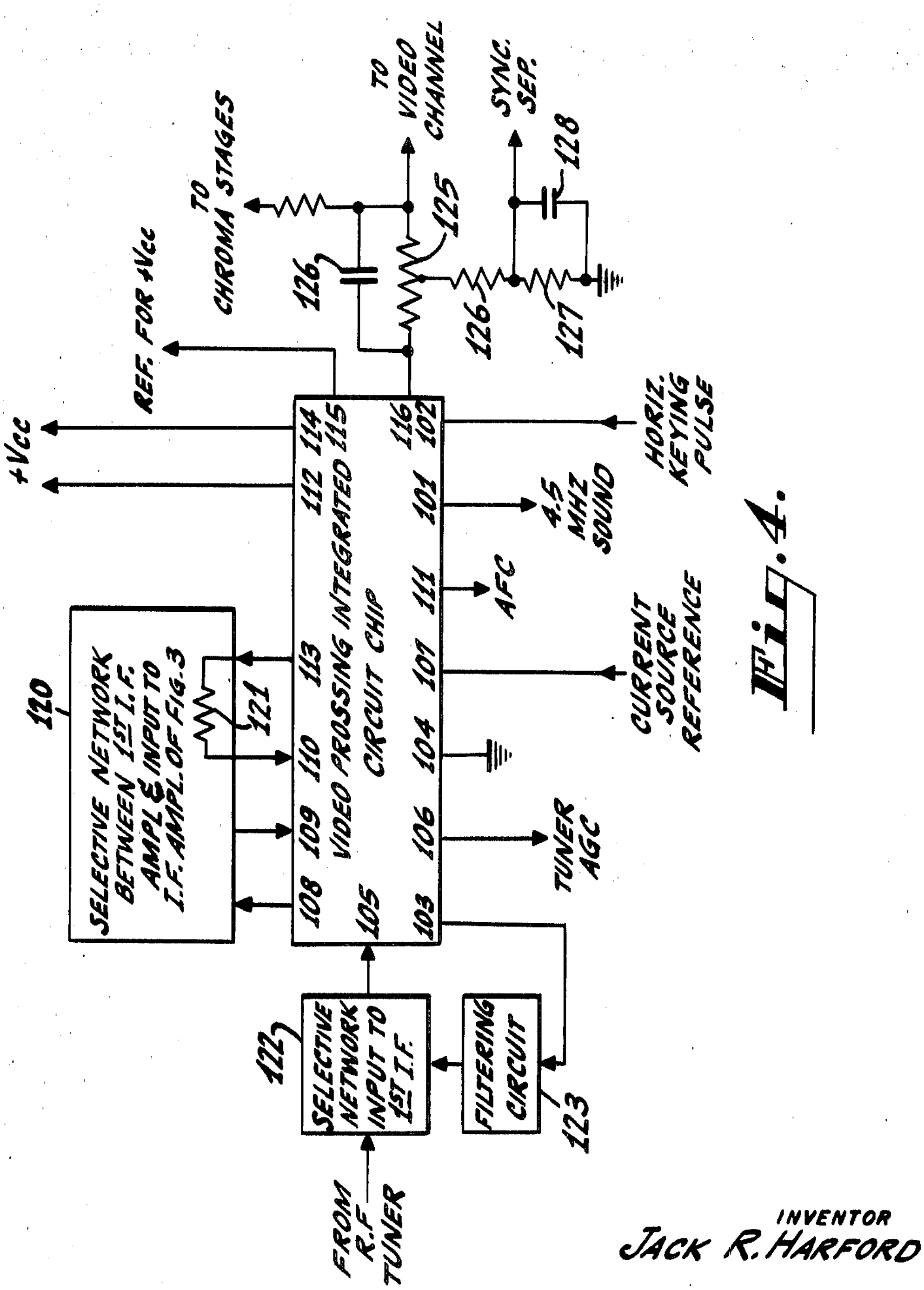
FIG. 4 is a schematic diagram of a video processing integrated circuit chip, not to scale, showing related circuit configurations in block form.

FIG. 4 shows a plain view, not to scale of an integrated circuit chip which includes the circuitry described in conjunction with FIG. 3 plus additional circuitry described in the Avins application noted hereinbefore. Filtering for IF bandwidth shaping is accomplished by a selective network 120 coupled between a first IF amplifier which is also included on the integrated circuit chip, although not described herein, and a second IF module including transistors 40, 46, 49, 50 and 52 of FIG. 3. The output from the first IF amplifier is obtained at terminal 108 and is applied to the selective filter 120. Filter 120 contains suitable trap circuits for separating the sound IF carrier and for applying it to terminal 109 of the chip and therefrom to a sound detecting and amplifying circuit also included on the chip and further described in the above noted copending application.

A suitable terminal of the filter is likewise coupled to terminal 110 which as seen from FIG. 3 is the input terminal to the emitter follower 40 of the IF amplifier described in conjunction with FIG. 3. The filter network includes a D.C. path between terminal 110 and terminal 113 which path is generally represented by resistor 121 included within the selective filter network. The signal at terminal 113 is representative of the D.C. reference current used for biasing the video detector portion of the circuitry described in FIG. 3. The voltage at terminal 113, dependent upon this current, is fedback to the input terminal 110 to assure optimum biasing of the IF amplifier and video detector stage for maximum linear operation.

The IF carrier waves from the RF tuner are applied to the input of a selective network 122 located off the integrated circuit substrate. The filtered IF is applied to terminal 105 which is the input terminal of a first stage IF circuit included on this chip and described in said copending application.

An AGC signal is also developed on this chip for application to the input IF stage. The AGC signal is developed at terminal 103 and is applied through a filtering circuit 123 to the input terminal 105. An AGC signal to be applied directly to the tuner RF amplifier is also developed on the chip and is available at terminal 106. My copending application entitled "Automatic Gain Control Circuit," Ser. No. 803,590 filed Mar. 3, 1969, describes the AGC circuit and operation in greater detail.

The terminal 107 on the chip is connected to an external current source reference used for establishing quiescent operating characteristics in the low level first IF stage (not shown) and necessary for determining the AGC delay characteristics of the same. Terminal 111, described in FIG. 3, provides an IF signal for application to automatic frequency control circuitry. Terminal 101 is an output terminal for the 4.5 mHz. sound signal generated on the chip and necessary for providing the audio portion of the television display. Terminal 102 is adapted to receive a horizontal keying pulse necessary for a keyed AGC operation. The demodulated and amplified video signal is derived from terminal 116. Coupled to terminal 116 is a T-network including the tapped inductor 125 having its end terminals shunted by a capacitor 126. The tap of inductor 125 is referenced to ground through a voltage divider comprising resistors 126 and 127. Resistor 127 is shunted by a capacitor 128. The signal at the junction between resistors 126 and 127 is used to drive the synchronizing signal separator circuits and provides the video signal containing the synchronizing component necessary for sync separator operation. In a color receiver the output terminal of the inductor 125 is coupled to the video amplifier channel and to a chroma channel. The main function of the T-network is to drop the 4.5 mHz. sound carrier and to provide impedance matching between the integrated circuit chip and the video channel delay line, as well as the chroma stage for a color receiver.

What is claimed is:

1. In a signal modulation detector circuit of the type including:

an input circuit for providing a signal modulated carrier wave and a direct voltage not related to the modulation components of said carrier wave;

an output circuit for deriving the modulation components of said carrier wave; and a rectifying device coupled between said input and output circuits;

a stabilization circuit for said rectifying device comprising:

means coupled to said input circuit for deriving a direct voltage responsive to substantially only said direct voltage not related to the modulation components of said carrier wave, and means for applying said derived direct voltage to said rectifying device.

2. An amplitude modulation detector comprising:

first and second transistors both having base, emitter and collector electrodes, signal input circuit means coupled between the base electrode of said first transistor and a common terminal, output circuit means coupled between the emitter electrode of said first transistor and a common terminal, a first resistor and a capacitor connected in the order named between the base electrode of said first transistor and said common terminal, means connecting the base electrode of said second transistor to the junction between said first resistor and capacitor, an impedance element connected between the emitter electrode of said second transistor and said common terminal, and a second resistor connected between the emitter electrodes of said first and second transistors.

3. A detector as defined in claim 2 wherein said impedance element comprises the collector-to-emitter current path of a third transistor.

4. An amplitude modulation detector comprising:

first, second, third and fourth transistors each having base, emitter and collector electrodes;

signal input circuit means connected between the base electrode of said first transistor an a common terminal;

means connecting the emitter electrode of said first transistor to the base electrode of said second transistor;

output circuit means connected between the emitter electrode of said second transistor and said common terminal;

a first resistor and a capacitor connected in the order named between the base electrode of said first transistor and said common terminal;

means connecting the base electrode of said third transistor to the junction between the first resistor and capacitor;

means connecting the collector electrode of said fourth transistor to the emitter electrode of said third transistor;

means connecting the emitter electrode of said fourth transistor to said common terminal;

means connecting the base electrode of said fourth transistor to said output circuit; and an impedance element connected between the emitter electrode of said first and third transistors.

5. In an amplitude modulation detector of the type employing a rectifying junction and a capacitor coupled to an output electrode of said junction, for providing detected signals across said capacitor when intermediate frequency signals including an undesired D.C. component are applied to an input terminal of said rectifying junction, the combinaton therewith comprising:

(a) first means coupled to said input terminal of said rectifying junction for providing a first current having a magnitude substantially determined by said D.C. component, (b) second means coupled to said output terminal for providing a second current having a portion of the magnitude determined by said D.C. component, which portion of said current magnitude is substantially equal to said first current, and a portion of the magnitude determined by the amplitude of said detected signal, (c) third means coupled to said first and second means for bypassing said currents through a first path to a point of reference potential to cause substantially all of said first and second currents as determined by said undesired D.C. component to flow therethrough, while directing said portion of said second current determined by said dected signal through a second path in shunt with said first path, (d) means coupled between said third means and said output terminal of said rectifying device responsive to said current through said second path, for discharging said capacitor in accordance with the magnitude of that current portion determined by said detected signal.

6. The video detector according to claim 5 wherein said third means coupled to said first and second means comprises:

(a) a first transistor having a base, emitter and a collector electrode, said emitter electrode coupled to a point of reference potential, (b) a semiconductor diode coupled between said base electrode and a point of reference potential and poled to conduct current in the same direction as the base to emitter junction of said transistor.

(c) a first resistor, coupled between the base electrode of said transistor and said first means, (d) a second resistor of substantially the same magnitude as said first resistor coupled between the collector electrode of said transistor and said second means, whereby approximately equal currents flow through said first and second resistors, and approximately equal currents flow through said diode and said emitter to collector path of said transistor, (e) a second semiconductor diode coupled between said collector electrode and said point of reference potential and poled in the same current direction as said first diode, for conducting any current from said second means flowing in accordance with the amplitude of said detected signal.

7. The detector according to claim 6 further comprising:

(a) a second transistor having a base, collector and an emitter electrode, said emitter electrode returned to a point of reference potential, said base electrode directly connected to said collector electrode of said first transistor, said base to emitter junction of said transistor having a dynamic impedance of a greater magnitude than the dynamic impedance of said second diode for directing a relatively small portion of said current from said diode to said base to emitter junction, and (b) an impedance coupled between said collector electrode of said second transistor and a source of operating undirectional potential, said impedance of a magnitude to permit said collector electrode to provide a voltage signal between said collector electrode and said point of reference potential, approximately equal to the magnitude of said unidirectional potential operating source.

8. In a signal modulation detector of the type employing a rectifying junction and a capacitor coupled to an output electrode of said junction, for providing detected signals across a capacitor when intermediate frequency signals including an undesired D.C. component are applied to an input terminal of said rectifying junction, said undesired potential being of a polarity to undesirably charge said capacitor, the combination therewith comprising:

(a) first means coupled between the input and output electrodes of said rectifying junction responsive to said undesired D.C. component and said detected signals for providing a control signal at an output thereof having an amplitude according to the magnitude of said detected signal and substantially independent of said undesired D.C. component;

(b) a resistor coupled between said junction of said output electrode of said rectifying device and said capacitor;

(c) means coupled between said first means and said resistor for discharging said capacitor through said resistor in accordance with the magnitude of said detected signals.

9. A circuit for responding to video intermediate frequencies from a video intermediate frequency signal source of low signal levels, which includes an undesired D.C. component, to provide a detected video signal therefrom, comprising:

(a) a first transistor having a base, emitter and collector electrode arranged in a common collector configuration and having said base electrode directly connected to said video intermediate frequency signal source, (b) a capacitor coupled between said emitter electrode and a point of reference potential to provide at said emitter electrode a detected video signal, (c) a second transistor having a base, emitter and collector electrode arranged in a common collector configuration, (d) means including a resistor, coupled between the base electrodes of said first and second transistors for applying said undesired D.C. component to said base electrode of said second transistor while isolating said base electrode from said video intermediate frequency signals, (e) a third transistor having a collector electrode coupled to the emitter electrode of said second transistor and having an emitter electrode coupled to a point of reference potential, (f) a resistor coupled between the collector electrode of said third transistor and the emitter electrode of said first transistor, (g) circuit means coupled between said emitter electrodes of said first and second transistors responsive to said undesired D.C. component as appearing at said both electrodes of said detected video signal, for providing at an output terminal thereof a control signal having an amplitude substantially determined by said video signal irrespective of said magnitude of said undesired D.C. component, (h) a coupling path between said output terminal of said circuit means and said base electrode of said third transistor for discharging said capacitor through said resistor and the collector to emitter path of said third transistor in accordance with the magnitude of said detected video signal.

10. In combination:

(a) a source of video intermediate frequency signals including a predetermined unidirectional potential component, (b) a first transistor arranged in a common collector configuration having a base electrode directly coupled to said video intermediate frequency source, (c) a capacitor coupled between the emitter electrode of said first transistor and a point of reference potential, to provide at said emitter electrode a detected video signal in accordance with the magnitude of said video intermediate frequency signals, (d) a second transistor arranged in an emitter follower configuration, (e) means, including a resistor, coupled between the base electrodes of said first and second transistors for applying said unidirectional potential component to said base electrode of said second transistor, while substantially isolating from said base electrode said video intermediate frequency signals, (f) first means coupled to said emitter electrode of said first transistor to provide a first current having a magnitude substantially determined by said predetermined direct potential, and any potential due to said detected video signals, (g) second means coupled to said emitter electrode of said second transistor to provide a second current having a magnitude substantially determined by said predetermined direct potential, (h) third means coupled to said first and second means, responsive to said first and second currents for directing that portion of said currents as dependent upon said predetermined potential to primarily flow therethrough, and for shunting any current component of said first current due to said detected video signal, through a low impedance unidirectional current path, and (i) fourth means coupled between said third means and said emitter electrode of said first transistor responsive to said shunted current, in said unidirectional current path, due to said detected video signal, for discharging said capacitor in accordance with the magnitude of said current.

11. The combination according to claim 10 wherein, said fourth means coupled between said third means and said emitter electrode of said first transistor comprises:

(a) a third transistor having a base, collector and emitter electrode, said emitter electrode coupled to a point of reference potential, and said base electrode directly coupled to said third means, (b) a resistor coupled between said collector electrode of said transistor and said emitter electrode of said first transistor, for discharging said capacitor in accordance with the magnitude of said current as applied to said base electrode through said low impedance unidirectional path of said third means.

12. A video detector for operating on video intermediate frequency signals, supplied by an intermediate frequency signal source having a predetermined D.C. potential associated therewith, to provide detected video signals, comprising:

(a) a first transistor having a base, collector and emitter electrode, said base electrode direct coupled to said intermediate frequency signal source, (b) a capacitor coupled between said emitter electrode and a point of reference potential for providing a detected video signal thereacross in accordance with the magnitude of said video intermediate frequency signals, (c) a second transistor having a base, collector and an emitter electrode, (d) means, including a resistor, coupling said base electrode of said first transistor to said base electrode of said second transistor for applying said predetermined D.C. potential to said base electrode of said second transistor while isolating said base from said video intermediate frequency signals, (e) a third transistor having a base, collector and emitter electrode, the collector to emitter path of said third transistor coupled between said emitter electrode of said second transistor and a point of reference potential, (f) a resistive impedance coupled between the collector electrode of said third transistor and the emitter electrode of said first transistor, (g) circuit means coupled between the emitter electrodes of said first and second transistors responsive to any potentials thereat for cancelling said predetermined potential component, while providing a control signal having an amplitude proportional to said detected video signal, (h) a coupling path between said circuit means and said base electrode of said third transistor for discharging said capacitor through said resistor and the collector to emitter path of said third transistor in accordance with the amplitude of said control signal.

References Cited

UNITED STATES PATENTS

| | | | |
|---|---|---|---|
| 3,182,267 | 5/1965 | Myer | 329—101 |
| 3,461,233 | 8/1969 | Kent et al. | 178—7.3E |

RICHARD MURRAY, Primary Examiner

GEORGE G. STELLAR, Assistant Examiner

U.S. Cl. X.R.

178—7.3; 325—318, 487; 329—178